United States Patent
Engel

(10) Patent No.: US 6,314,708 B1
(45) Date of Patent: Nov. 13, 2001

(54) ROTARY CONVEYOR TINE STRIPPER

(75) Inventor: Manfred Engel, Grosssteinhausen (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/594,250

(22) Filed: Jun. 15, 2000

(51) Int. Cl.$^7$ .............................. A01D 78/00; A01D 80/00
(52) U.S. Cl. ............................ 56/341; 198/497; 198/693; 56/364
(58) Field of Search ............................ 56/341, 343, 364; 100/88, 89; 198/497, 613, 693

(56) References Cited

U.S. PATENT DOCUMENTS

| | | | |
|---|---|---|---|
| 4,085,573 | * 4/1978 | Marsh | 56/364 |
| 4,484,684 | * 11/1984 | Tetreault | 198/613 |
| 5,595,055 | * 1/1997 | Horchler, Jr. et al. | 56/341 |
| 5,848,523 | * 12/1998 | Engel et al. | 56/341 |
| 5,979,153 | * 11/1999 | Roth | 56/341 |

FOREIGN PATENT DOCUMENTS

0803184 * 10/1997 (EP).

* cited by examiner

Primary Examiner—Robert E. Pezzuto
Assistant Examiner—Nathan Mammen

(57) ABSTRACT

A stripper for lifting crop off flat rigid tines of a rotary conveyor is molded of ultra high molecular weight polyethylene. The stripper is oval-shaped in side view and is constructed of identical halves which each include a pair of spaced apart, parallel side walls that have marginal portions defined by rims which have a thickness greater than that of the side walls. An intermediate, concave wall extends between and is joined to the bases of the rims, which have a height measured from the respective base that is approximately twice the thickness of the associated side walls.

4 Claims, 4 Drawing Sheets

ROTARY CONVEYOR TINE STRIPPER

The present invention relates to a rotary conveyor for a large round baler and more specifically relates to a stripper for rigid tines of the conveyor.

BACKGROUND OF THE INVENTION

U.S. patent application Ser. No. 09/436,329, filed on Nov. 8, 1999, discloses a rotary conveyor including rigid tines that are formed from a flat plate, and with the tines each rotating between a pair of closely spaced, oval-shaped plastic strippers which act to strip material off the tines. These plastic strippers are not entirely satisfactory since their wear life is not as great as desired and also because as the strippers become excessively worn their profile changes to such an extent that a shearing action occurs between the stripper and the tines rather than a more desirable scissors action.

SUMMARY OF THE INVENTION

According to the present invention there is provided a stripper design which represents an improvement over the aforementioned known stripper.

An object of the invention is to provide a plastic stripper having a greatly improved wear life as compared to that of the prior art stripper.

A more specific object of the invention is to provide a stripper constructed so as to have one or more of the features of: (a) being of increased cross section in high wear areas, (b) being concave in cross section so as to orient or channel crop before the crop enters the baling chamber, (c) being constructed of a plastic having a relatively long wear life, and (d) being constructed of identical halves that can be inverted so as to double the life of the halves.

These and other objects will become apparent from a reading of the ensuing description together with the appended drawings.

DESCRIPTION OF THE PREFERRED EMBODIMENT

Figure 1:
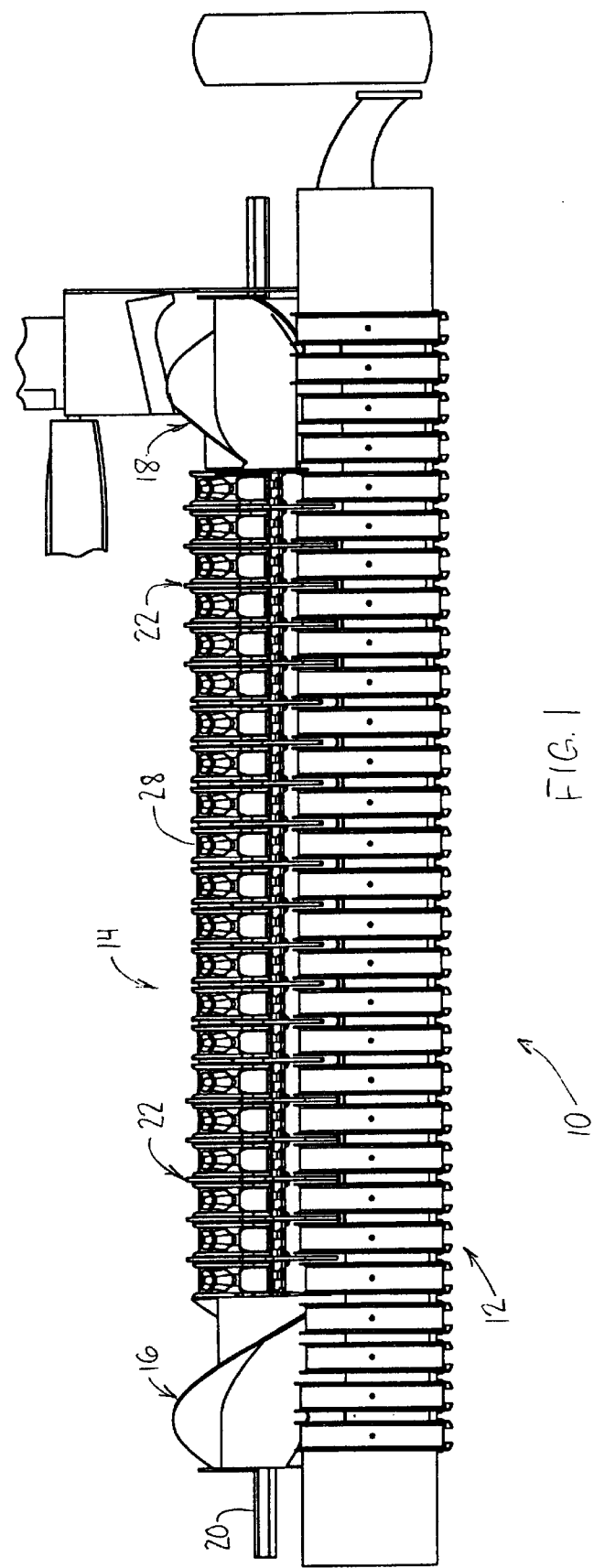
FIG. 1 is a somewhat schematic, front elevational view showing a wide pick-up together with a rotary conveyor with which is associated strippers constructed in accordance with the present invention.
Figure 2:
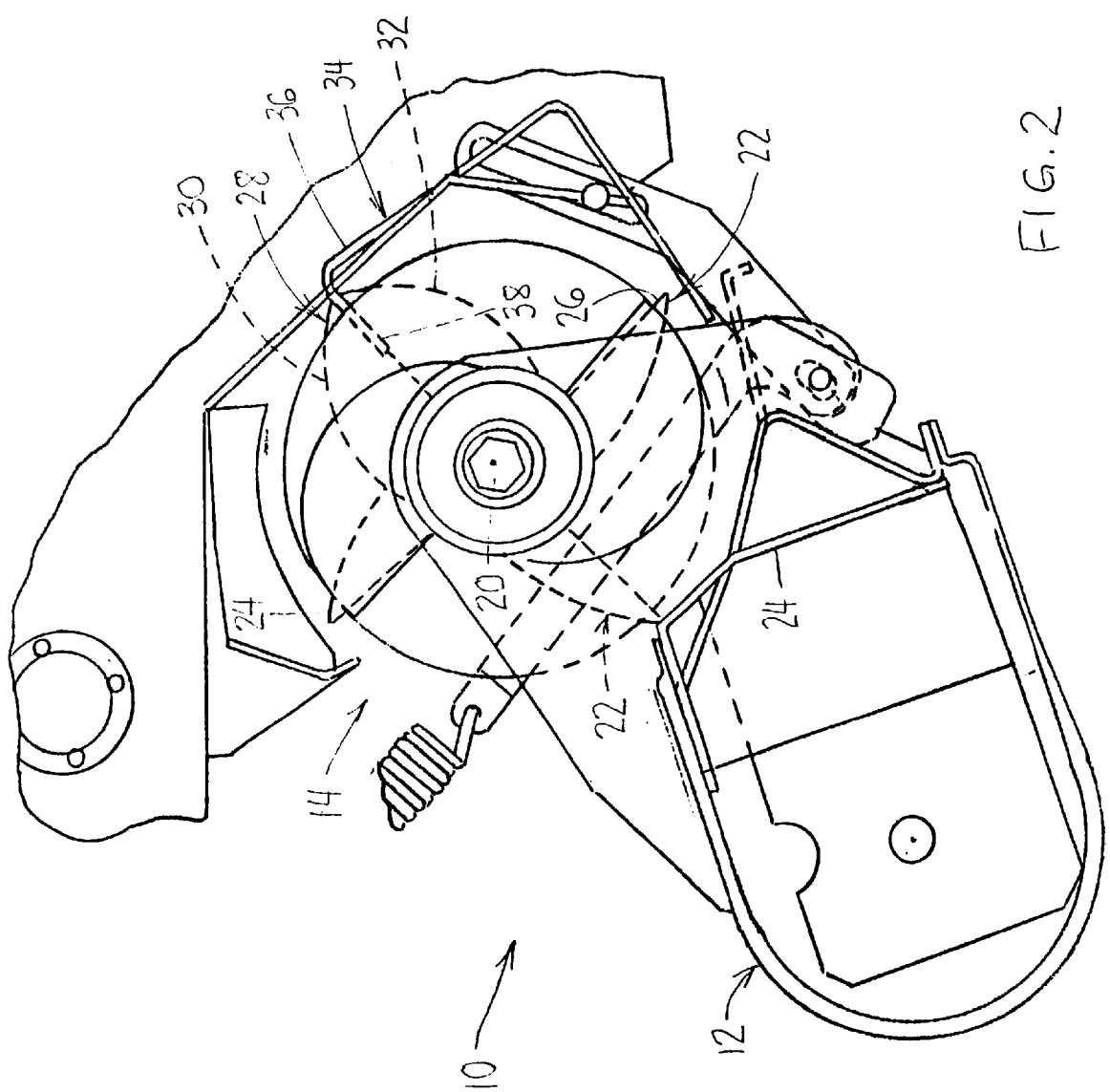
FIG. 2 is a left side elevational view of the rotary conveyor.
Figure 3:
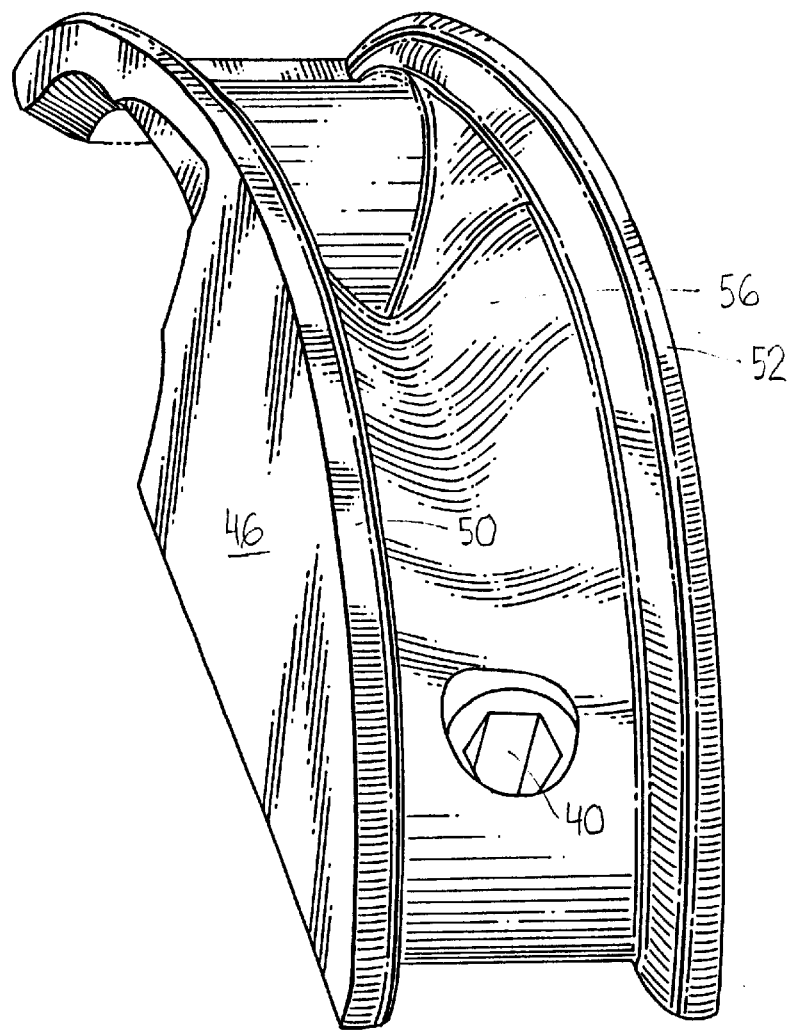
FIG. 3 is a perspective view of the top half of the stripper.
Figure 7:
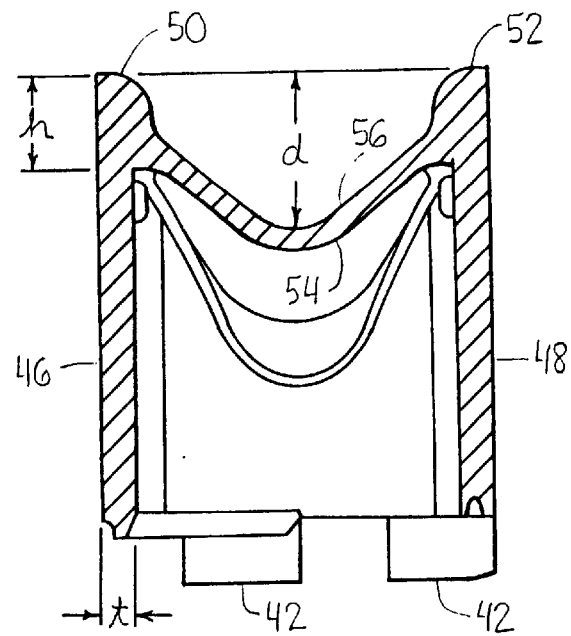
FIG. 7 is an enlarged vertical cross sectional view taken at line 7—7 of FIG. 4.
Figure 5:
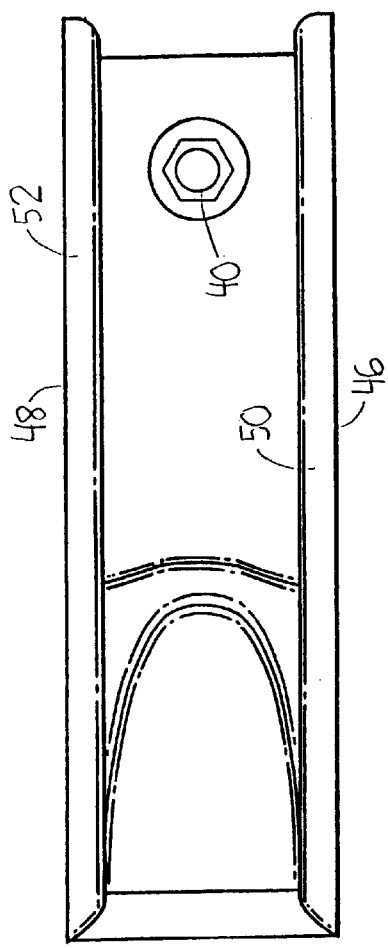
FIG. 5 is a top view of the stripper half shown in FIG. 4.
Figure 4:
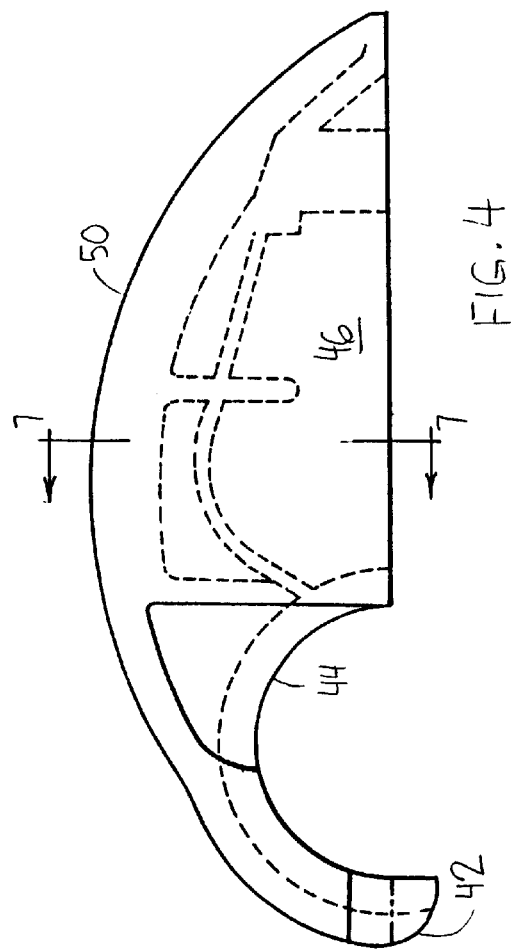
FIG. 4 is a side elevational view of the stripper half shown in FIG. 2.
Figure 6:
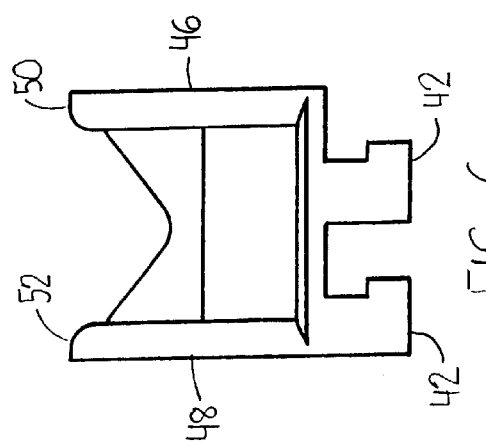
FIG. 6 is a left end view of the stripper half shown in FIG. 4.

Referring now to FIG. 1, there is shown a crop conveying arrangement 10 which, for example, is used as part of a baler for making large cylindrical bales, the conveying arrangement 10 functioning for picking up and delivering windrowed crop to the baling chamber of the baler. The conveying arrangement 10 includes a pick-up 12 of a conventional structure including a plurality of spring tooth tines (not shown) which are rotated about a transverse axis so as to lift a windrow of crop material from the ground and deliver it to a rotary conveyor 14. The rotary conveyor 14 is provided with right- and left-hand crop centering augers 16 and 18, respectively, which narrow the stream of crop, for example, to the width of the baling chamber. Referring now also to FIG. 2, it can be seen that a plurality of rigid tine structures 22 are mounted on the shaft 20 between the augers 16 and 18. Each of the tine structures 22 is in the form of a plate configured to define a pair of diametrically opposite tines 24 and 26 having arcuate leading edges. A plurality of oval shaped tine strippers 28 are mounted in side-by-side spaced relationship so as to define respective slots for the passage of the tines 26 and 28 of the respective tine structures 22 during rotation of the shaft 20.

The strippers 28 are each constructed of upper and lower halves 30 and 32. Preferably, the stripper halves 30 and 32 are identical and are molded from ultra high molecular weight (UHMW) polyethylene, which material has a high wear tolerance. A stripper support wall 34 extends transversely behind the rotary conveyor 14 and terminates in a plurality of transversely spaced tabs 36 including downwardly and forwardly inclined mounting portions 38 which are located approximately mid way between the two and three o'clock positions about the shaft 20 of the rotary conveyor 14. Each tab mounting portion 38 is received in a slot defined in the rear of a respective one of the strippers 28 by the upper and lower halves 30 and 32.

With reference now also to FIGS. 3–7, there is shown the upper identical half 30. From this, it will be understood that the halves 30 and 32 are each provided with a mounting hole 40, with the holes being aligned and receiving a mounting bolt (not shown) which clamps the stripper halves 30 and 32 together and onto the tab mounting portion 38. Forward ends of the stripper halves 30 and 32 each include a pair of L-shaped projections 42 which are interlocked to define a hinge joint about which the halves may pivot relative to each other. The front portions of the stripper halves 30 and 32 are each provided with a semi-cylindrical recess 44 which cooperate to define a cylindrical opening through which the rotary conveyor shaft 20 extends when the strippers are mounted to the tabs 36. That portion of the stripper halves 30 and 32 that is to the rear of the recess 44 includes opposite planar, parallel side walls 46 and 48 having thickened margin portions which, as viewed from the side, define respective rims 50 and 52 that are curved arcuately at a fixed radius. As can best be seen in FIG. 7, the rims 50 and 52 are approximately one third thicker than, and have a radial height h equal to approximately twice the thickness t of, the remainder of the side walls 46 and 48. Joining the radially inner portion or base of each of the rims 50 and 52 is an intermediate, concave wall 54 that extends radially inwardly from the base by a distance equal to approximately the radial height of the rims 50 and 52 so as to form a crop guide channel 56 that functions to orient the crop in a fore-and-aft direction as it is conveyed to the rear by the rotary conveyor 14.

In one satisfactory embodiment of the invention, the radius of the rims is 120 mm while the thickness of the walls 46 and 48 is a constant 4.6 mm except at the rims 50 and 52 which are each approximately 8 mm thick and have a radial height of 9 mm beyond the juncture with the intermediate wall 54. The concavity of a major portion of the wall 54 is such that the transverse middle portion of the wall 54 is located radially inwardly from the outer radius of the rims 50 and 52 by a distance d of about 15 mm. These dimensions, together with using UHMW polyethylene material resulted in a stripper 28 having a wear life of about ten times that achieved by the prior art stripper and with the wall 54 acting to orient crop in the fore-and-aft direction. Furthermore, because the stripper halves 30 and 32 are identical, the stripper 28 may be inverted when the upper half becomes too worn for satisfactory operation.

What is claimed is:

1. In a stripper, for rigid flat tine a rotary conveyor, including identical halves coupled together so as to define an oval shape when viewed from the side, each half of the stripper having a pair of spaced parallel planar side walls including marginal portions defining arcuate rims and an intermediate wall extending between and joining a base location of said arcuate rims, the improvement comprising: the rims of each stripper half having a thickness greater than that of said side walls and having a height above said intermediate wall which is approximately twice the thickness of said side walls.

2. The stripper defined in claim 1 wherein said intermediate wall is concave in vertical cross section over most of its length between said side walls.

3. The stripper defined in claim 2 wherein the concavity of said intermediate wall is such that it results in the middle of said intermediate wall being spaced from a line extending between respective locations where the intermediate wall joins the rims in a direction opposite from peripheral portions of said rims by an amount greater than the distance between said peripheral portions and said line.

4. The stripper defined in claim 1 wherein said stripper is constructed of ultra high molecular weight polyethylene.

* * * * *